US012785906B2

(12) United States Patent
Arzelier et al.

(10) Patent No.: US 12,785,906 B2
(45) Date of Patent: Nov. 3, 2026

(54) CHANNEL ACCESS MECHANISMS IN WIRELESS COMMUNICATIONS

(71) Applicant: TOYOTA JIDOSHA KABUSHIKI KAISHA, Toyota (JP)

(72) Inventors: Claude Arzelier, Varna (BG); Kai-Erik Sunell, Naantali (FI); Takayuki Shimizu, Mountain View, CA (US); John Kenney, Mountain View, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/048,512

(22) Filed: Feb. 7, 2025

(65) Prior Publication Data

US 2025/0192962 A1 Jun. 12, 2025

Related U.S. Application Data

(63) Continuation of application No. PCT/JP2023/026558, filed on Jul. 20, 2023.

(60) Provisional application No. 63/371,039, filed on Aug. 10, 2022.

(51) Int. Cl.
*H04L 5/00* (2006.01)
*H04L 1/1812* (2023.01)
*H04W 72/40* (2023.01)

(52) U.S. Cl.
CPC .......... *H04L 5/0055* (2013.01); *H04L 1/1812* (2013.01); *H04W 72/40* (2023.01)

(58) Field of Classification Search
CPC ..... H04L 5/0055; H04L 1/1812; H04W 72/40
USPC .......................................................... 370/329
See application file for complete search history.

(56) References Cited

U.S. PATENT DOCUMENTS

| | | | | |
|---|---|---|---|---|
| 2020/0178290 | A1* | 6/2020 | Lee | H04W 72/20 |
| 2020/0267729 | A1* | 8/2020 | Kim | H04W 72/20 |
| 2022/0030575 | A1 | 1/2022 | Farag | |
| 2022/0095280 | A1 | 3/2022 | Farag et al. | |
| 2022/0150730 | A1* | 5/2022 | Freda | H04W 24/04 |
| 2022/0225295 | A1 | 7/2022 | Sartori et al. | |
| 2023/0209388 | A1 | 6/2023 | Hwang et al. | |
| 2023/0254884 | A1* | 8/2023 | Ibrahim | H04W 72/02 370/329 |

FOREIGN PATENT DOCUMENTS

WO WO 2022/071741 A1 4/2022

OTHER PUBLICATIONS

3GPP TSG RAN WG1 Meeting #107-e "Considerations on partial sensing and DRX in NR Sidelink," Fujitsu, R1-2111150, Nov. 11-19, 2021, pp. 1-18.

* cited by examiner

*Primary Examiner* — Mang Hang Yeung
(74) *Attorney, Agent, or Firm* — Finnegan, Henderson, Farabow, Garrett and Dunner, LLP

(57) ABSTRACT

A method for selecting a sidelink radio resource by a user equipment (UE) includes transmitting on a selected radio resource from the UE to one or more receivers; determining whether the UE successfully transmits on the selected radio resource; based on a determination that the UE successfully transmits on the selected radio resource, identifying the selected radio resource as a preferred radio resource; and on a next transmission opportunity by the UE, prioritizing transmission on the preferred radio resource.

2 Claims, 2 Drawing Sheets

CHANNEL ACCESS MECHANISMS IN WIRELESS COMMUNICATIONS

CROSS-REFERENCE TO RELATED PATENT APPLICATION

This application is a continuation of International Patent Application No. PCT/JP2023/026558, filed on Jul. 20, 2023, which claims the benefit of priority of U.S. Provisional Patent Application No. 63/371,039, filed on Aug. 10, 2022, both of which are incorporated by reference herein.

TECHNICAL FIELD

This disclosure relates to channel access mechanisms in wireless communications, and in particular, to selecting a sidelink radio resource by a user equipment for transmission.

BACKGROUND ART

Sidelink communication is used in 3GPP radio interfaces to allow two (or more) User Equipments (UEs) (e.g., wireless devices) to directly communicate with each other. This may happen under the coverage of a cellular network, out of coverage of the cellular network, or in partial coverage of the cellular network where only one of the two UEs is under the cellular network coverage. In an example of 3GPP, the device-to-device direct communication uses the PC5 interface.

SUMMARY OF INVENTION

In some embodiments, a method for selecting a sidelink radio resource by a user equipment (UE) is provided. The method includes transmitting on a selected radio resource from the UE to one or more receivers; determining whether the UE successfully transmits on the selected radio resource; based on a determination that the UE successfully transmits on the selected radio resource, identifying the selected radio resource as a preferred radio resource; and on a next transmission opportunity by the UE, prioritizing transmission on the preferred radio resource.

In some embodiments, a user equipment (UE) for selecting a sidelink radio resource is provided. The UE includes a memory configured to store instructions and a processor configured to execute the instructions stored in the memory. The processor is configured to transmit on a selected radio resource from the UE to one or more receivers; determine whether the UE successfully transmits on the selected radio resource; based on a determination that the UE successfully transmits on the selected radio resource, identify the selected radio resource as a preferred radio resource; and on a next transmission opportunity by the UE, prioritize transmission on the preferred radio resource.

In some embodiments, a non-transitory computer-readable medium storing instructions that are executable by one or more processors of a user equipment (UE) in a communication network to perform a method is provided. The method includes transmitting on a selected radio resource from the UE to one or more receivers; determining whether the UE successfully transmits on the selected radio resource; based on a determination that the UE successfully transmits on the selected radio resource, identifying the selected radio resource as a preferred radio resource; and on a next transmission opportunity by the UE, prioritizing transmission on the preferred radio resource.

The above and other aspects and their implementations are described in greater detail in the following descriptions and in the drawings.

DESCRIPTION OF EMBODIMENTS

Figure 1:
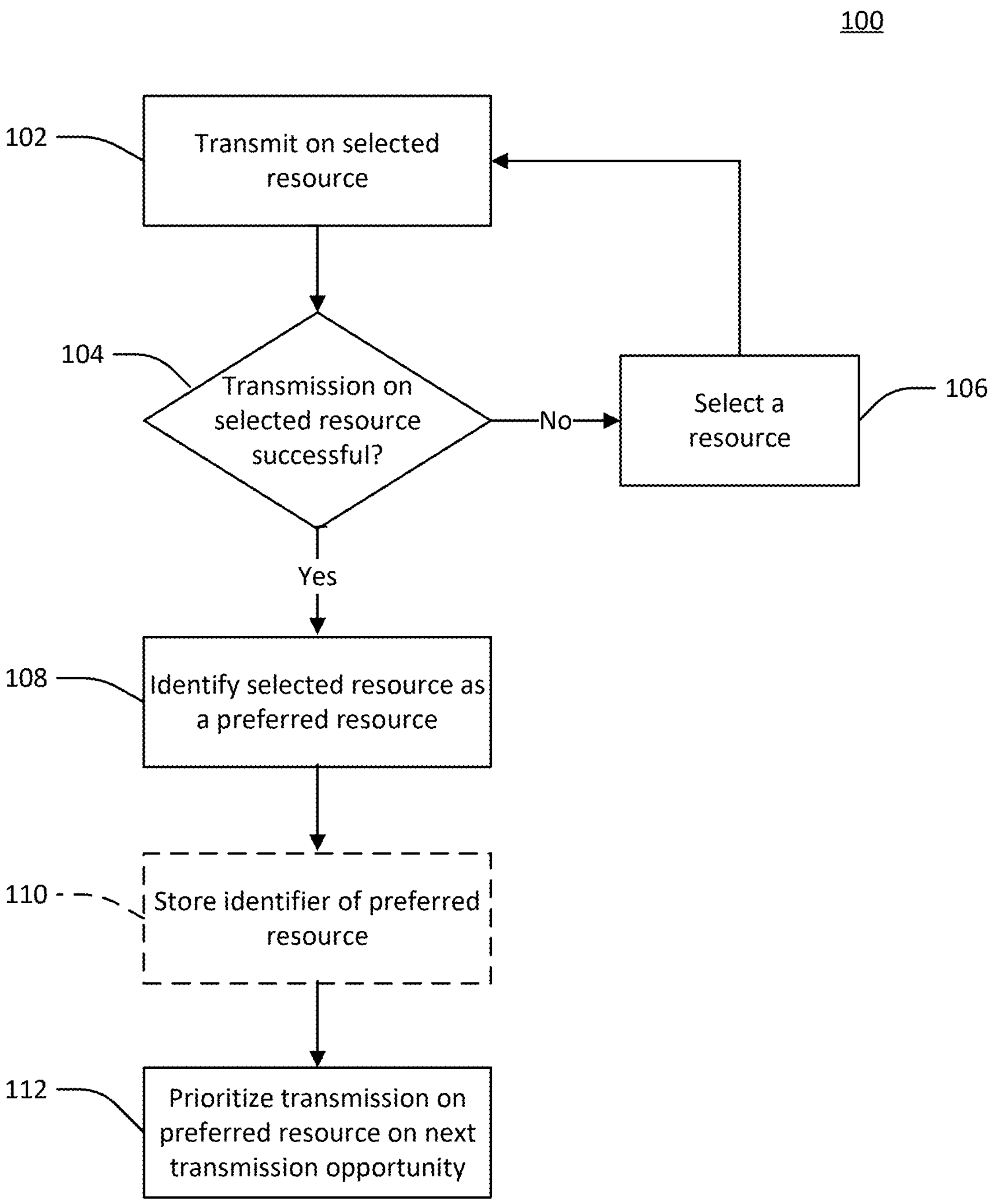
FIG. 1 is a flowchart of a method for selecting a sidelink radio resource by a user equipment (UE), consistent with some embodiments of the present disclosure.

Reference will now be made in detail to exemplary embodiments, examples of which are illustrated in the drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses, systems, and methods consistent with aspects related to subject matter that may be recited in the appended claims.

Generally described, one or more aspects of the present disclosure are directed to autonomous sensing of radio resources or radio resource reservation. Some embodiments described herein may apply to 3GPP Sidelink solutions, for example, 3GPP 5G NR-V2X PC5 mode 2 or 3GPP LTE-V2X PC5 mode 4.

Sidelink and Sensing

Resources are defined with time and frequency. With the UE autonomously allocating resources, with regards to a resource (re-)selection mechanism for SL, a sensing-based resource selection may perform resource exclusion based on sensing information, followed by resource selection from the remaining candidate resources, which involves randomness. It is also possible for the UE to perform resource selection based on randomness without sensing (referred to as "random resource selection"). Release 14/15 LTE SL and Release 16/17 NR SL already support both options. Sensing-based resource selection enables reliable communication by avoiding resource collisions as much as possible, but its power consumption and complexity are higher than random resource selection due to the sensing operation. Random resource selection is more suitable for battery-limited devices as no sensing operation is needed, but it may experience increased resource collisions. In general, the channel access latency is not an issue in sensing-based resource selection because sensing can be performed continuously in the background. The channel access latency of both solutions may be controlled by a packet delay budget parameter.

Listen-Before-Talk (LBT) sensing has been used for a potential wireless transmitter in 3GPP NR (New Radio) in Unlicensed Spectrum (NR-U), and LTE in Unlicensed Spectrum (for example, in Release 13 LTE Licensed Assisted Access).

The idea of LBT sensing in NR-U and LTE Licensed-Assisted Access (LAA) is that a potential transmitter senses a channel before transmitting. If the channel is considered "busy" (e.g., through determining a received energy detection threshold during specified durations), the potential transmitter would not transmit. If the channel is considered "free" (e.g., the received energy is below a threshold), the transmitter would transmit at a later time, as specified in the standards.

In 3GPP, there are two types of LBT techniques. A first LBT technique is a "Load Based Equipment" approach where the potential transmitter senses the channel when it requires transmission (with some defer periods possible). A second LBT technique is a "Frame Base Equipment" approach where the potential transmitter senses the channel at fixed time instants. These LBT mechanisms (especially Load Based Equipment) include some sort of "time randomness" and "back-off," to provide different UEs a fair chance of accessing the channel and avoiding successive collisions that would block the channel. For example, some random "back-off" periods may be used before transmission.

To provide other UEs (i.e., UEs other than the one that accessed the channel) some chance to access the channel, the 3GPP Technical Specifications provide a "Channel Occupation Time" that defines the total time duration for which eNB/gNB/UE and any eNB/gNB/UE(s) sharing the channel occupancy perform transmission(s) on a channel after an eNB/gNB/UE performs the corresponding channel access procedures. For determining a Channel Occupancy Time, if a transmission gap is less than or equal to 25 s, the gap duration is counted in the channel occupancy time. A channel occupancy time can be shared for transmission between an eNB/gNB and the corresponding UE(s). After this time duration expires, new sensing would be needed.

In LTE sidelink and NR sidelink, sensing is performed to collect resource reservation information from other UEs and measure SL-RSRP (sidelink reference signal received power) and SL-RSSI (sidelink received signal strength indicator) so that the transmitting UE can determine available resources in a selection window.

Selecting a radio resource randomly (e.g., from among a set of available radio resources) requires that the proportion of radio resources required for all UEs is small compared to the total available radio resources. Otherwise, resource collisions would happen between different UEs, resulting in degraded performance and a smaller number of UEs (or no UE) being able to communicate.

Different priority classes are allowed in NR-U Release 16 that leads to different "back-off" time periods and different channel occupancy times, to try to advantage some UEs compared to other UEs of different priority classes. However, this does not change the "random" nature of the initial channel access (especially for UEs within a specific priority class).

For NR Sidelink Release 16, the UE may make its radio resource (re-)selections based on sensing (for resource allocation Mode 2) within a resource pool. A resource pool, provided to the UE by configuration or pre-configuration (for example, provided to the UE with or without SIM (subscriber identity module)/USIM (universal subscriber identity module)), is defined in the frequency domain in terms of sub-channels, and in the time domain in terms of slots or subframes. The selected frequency resource may be used for multiple times with a fixed time interval for subsequent transmissions (this scheme is referred to as semi-persistent scheduling (SPS)) or only once (this scheme is referred to as one-shot transmission (OST)). Also, the UE may retransmit packets multiple times with or without feedback from one or more receiver UEs to improve the reliability (this is called Hybrid Automatic Repeat request, or HARQ, retransmissions).

In addition, the transmitter UE may perform resource reservation announcements for the transmission of the next transport block and retransmission(s) of the current transport block, to provide information to other UEs about which resources the transmitter UE has selected for future sidelink transmissions (so that the other UEs avoid those resources). This information is provided to other UEs by "First Stage Sidelink Control Information (SCI)," which is provided by the Physical Sidelink Control CHannel (PSCCH). The terminology "First Stage" is used because this "First Stage SCI" also contains information used to demodulate/detect another physical channel, the Physical Sidelink Shared CHannel (PSSCH) that carries the sidelink data, and also contains a "Second Stage SCI" used for control signaling. However, with all this, the transmitter UE autonomously selects some free available resources with some (uniformly distributed) random component. In addition, this does not change the issue of possible collisions due to the random component of the resource (re-)selection.

In NR-U Release 16, Channel Access types 2 (including Types 2A, 2B, or 2C) may be used after initiating a transmission following the initial sensing (Type 1). This involves sending some additional transmission almost immediately after the initial transmission. Depending on the size of the gap between the two transmissions, procedures 2A, 2B, or 2C may be used. Procedures 2A or 2B require sensing and procedure 2C requires no sensing. This does not solve the above issue, because they represent a "short term" sending of additional data within the Channel Occupancy Time (COT), after which a "Type 1" channel access procedure would start again.

For 3GPP LTE V2X PC5 mode 4, the UE selects the radio resource based on sensing and performs transmissions based on SPS and OST, similar to Release 16 NR-V2X PC5 mode 2. In addition, UEs may select and reserve resources based on sensing and geographical zones (for example, as defined in 3GPP TR 37.985), in which the UE performs transmission within the resource pool(s) associated with its current zone. This, however, is used for resource reservation after the sensing. The sensing and resource selection still experience the issues described above (i.e., possible collisions with other UE(s) using the same resource pool).

Use by the UE of Previously Successful Resources

One solution to the above issue is that the UE, while or after performing the sensing and/or resource (re-)selection, uses some previously successful resources, rather than some random resources. Previously successful resources may be defined to include resources that had led to a successful transmission in the past. For example, resources that led to a free channel, an absence of a collision following transmission after sensing a free channel, and/or a previous successful reception by one or more receivers. The absence of a collision following transmission after sensing a free channel may be determined by use of a timer (that may be pre-configured). A reply (including explicit positive reply) from the receiver (possibly within a predetermined time period) may be determined as a "success."

For the time-dimension of those resources, some timeslots (or sub-timeslots) may be defined as a reference. The UE performing the initial sensing may use a similar timeslot (or sub-timeslot) number as the previously successful timeslot. Timeslot numbering may be defined using a synchronization reference.

For example, if resource selection in one transmission opportunity is successful in the sense that the receiver acknowledges successful reception of the data, there was no collision. In that case, it may be advantageous to reuse the same resource for a subsequent transmission opportunity based on the rationale that the same resource in the next and subsequent transmission opportunities may have a higher likelihood of success than completely random and independent selections from a uniform distribution of resources.

In some implementations, the selected resource may be used for multiple times with a fixed time interval for subsequent transmissions in a scheme referred to as semi-persistent scheduling (SPS) or only once in a scheme referred to as one-shot transmission (OST). The difference between the proposed modification and the existing SPS scheme is that the transmitting UE reuses the resource only if that resource is previously successful. The benefit of the successful resource reuse approach is that it is possible to mitigate the persistent packet loss issue in SPS due to resource collisions, half duplex, and/or near-far problems. SPS is currently supported for both sensing-based resource selection and random resource selection in Release 16/17 NR SL.

Previously successful resources may be defined under different possible embodiments, including:

- Resource(s) (in terms of time and/or frequency) that led to successful sensing. For example, using a free channel determination, or using a no-collision check and/or receiving a reply from the receiver.
- Resource(s) (in terms of time and/or frequency) that led to successful MAC (Medium Access Control) reception.
- Resource(s) that led to successful PDCP (Packet Data Convergence Protocol) reception.
- Resource(s) that led to successful IP (Internet Protocol) packet reception.
- Resource(s) that led to successful RLC (Radio Link Control) SDU (Service Data Unit)/PDU (Protocol Data Unit) reception.
- Resource(s) that led to a successful physical layer connection and/or reception.
- Resource(s) that led to a successful PC5-RRC (Radio Resource Control) connection and/or reception.

As used herein, the term "successful" may be defined to include one or more successes as defined above. In some disclosed embodiments, "successful" may include one previous success or N previous successes, where N is an integer greater than one.

A previously successful resource may also be referred to as a "preferred resource." In the process above, the preferred resource(s) may be used to modify the sensing. For example, the UE, instead of selecting among the available resources randomly (that is, with a uniform distribution probability), the preferred resources may be associated with a probability higher than the non-preferred resources (for example, twice higher). The distribution rule may be defined in the standards; provided to the UE by network configuration, e.g., by Radio Resource Control (RRC) signaling; and/or provided to the UE by pre-configuration. As another example, the preferred resources may be used to bypass the initial sensing, i.e., the preferred resources may be used as an initial resource configuration.

FIG. 1 is a flowchart of a method 100 for selecting a sidelink radio resource by a user equipment (UE), consistent with some embodiments of the present disclosure. A radio resource is selected by the UE and the UE transmits on the selected radio resource to one or more receivers (step 102). A determination is made whether the UE successfully transmits on the selected radio resource (step 104). The term "successfully transmits" is defined elsewhere in this disclosure and examples of what constitutes a successful transmission are described below. If the UE does not successfully transmit on the selected radio resource (step 104, "no" branch), then the UE selects a radio resource (step 106) and the method 100 returns to step 102 to attempt to transmit on the selected other radio resource. In some embodiments, the radio resource is another radio resource, different from the selected radio resource used in step 104. In other embodiments, if the UE does not successfully transmit on the selected radio resource (step 104, "no" branch), then the UE selects a radio resource (step 106) that is either different than or the same as, a previously selected radio resource, e.g., the previously selected radio resource is added to a pool of potential radio resources from which a radio resource is selected each time step 106 is executed.

If the UE successfully transmits on the selected radio resource (step 106, "yes" branch), the selected radio resource is identified as a preferred radio resource (step 108). In some embodiments, an identifier of the preferred radio resource may be stored (step 110). It is noted that storing the identifier of the preferred radio resource is optional, as indicated by the dashed outline for step 110 in FIG. 1. For example, the identifier may be stored in a memory of the UE. The identifier may take the form of subcarriers, PRBs, or subchannels in the frequency domain and symbols, slots, or subframes in the time domain. On a next transmission opportunity, the UE prioritizes transmission on the preferred radio resource (step 112).

In some embodiments, the method 100 includes selecting a radio resource from a resource pool as the selected radio resource. The resource pool may be provided to the UE by configuration or pre-configuration.

In some embodiments, determining whether the UE successfully transmits on the selected radio resource includes determining whether the selected radio resource is available after a sensing on one or more radio resources.

In some embodiments, determining whether the UE successfully transmits on the selected radio resource includes determining absence of a collision on the selected radio resource during transmission. The absence of a collision may be determined based on no collision being detected within a predetermined time period after the transmission.

In some embodiments, determining whether the UE successfully transmits on the selected radio resource is determined based on a reply being received from the one or more receivers within a predetermined time period after the transmission.

In some embodiments, determining whether the UE successfully transmits on the selected radio resource includes determining that there was a previous successful reception by the one or more receivers from the UE on the selected radio resource.

In some embodiments, determining whether the UE successfully transmits on the selected radio resource includes determining that a hybrid automatic repeat request acknowledgement is received for the transmission.

In some embodiments, determining whether the UE successfully transmits on the selected radio resource includes determining that a hybrid automatic repeat request negative acknowledgement is not received for the transmission within a predetermined time period.

In some embodiments, determining whether the UE successfully transmits on the selected radio resource includes determining that the transmission led to any one of: a successful radio link control reception, a successful radio link control service data unit reception, a successful radio link control service data unit segment reception, a successful radio link control protocol data unit reception, a successful medium access control reception, a predetermined number of hybrid automatic repeat request acknowledgements, a predetermined number of hybrid automatic repeat request acknowledgements within a predetermined time period, a successful Internet Protocol packet reception, a successful physical layer connection, or a successful physical layer reception. The successful physical layer reception may be, for example, on a physical uplink control channel or on a physical sidelink shared channel.

In some embodiments, whether the UE successfully transmits is based on using random resource selection. The preferred radio resource may have a higher probability than one or more other radio resources.

In some embodiments, identifying the selected radio resource as a preferred radio resource includes identifying the selected radio resource as the preferred radio resource after a predetermined number of successful transmissions using the selected radio resource or after a predetermined number of successful transmissions using the selected radio resource within a predetermined time period.

In some embodiments, the method 100 further includes selecting the preferred radio resource based on sensing on one or more radio resources and transmitting on the preferred radio resource.

In some embodiments, the preferred resources apply to the UE that successfully transmitted the first burst (e.g., radio frame) in the communication exchange. The successfully transmitting UE may also be referred to herein as the transmitter UE or the transmitting UE.

In another embodiment, the receiver UE that had a successful communication with a transmitter UE while it did not trigger the initial burst, may consider this initial resource as not allowed (and/or deprioritized, for example, by having a lower distribution probability), so that it remains "reserved" for the transmitter UE. The opposite is also possible, i.e., the initial transmitter UE de-prioritizes the resource and the initial receiver UE prioritizes the resource.

In another embodiment, the transmitter UE determines preferred resources and non-preferred resources in a sub-channel level (a set of resource blocks) or resource block level in the frequency domain.

In another embodiment, the transmitter UE uses different probabilities depending on packet priorities. The probabilities for different packet priorities are configured or pre-configured, are defined by 3GPP specifications, or are up to implementation or higher layers. The "priority" meant here may be the Priority Class (currently 1 to 4) or may be other priority such as, for example, PPPP (ProSe Per-Packet Priority), the logical channel priority, and/or Quality of Service priority.

In another embodiment, the transmitter UE uses different probabilities depending its Radio Access Capabilities or Radio Access Technology (for example, LTE or NR), and/or depending on the Radio Access capability effectively used for the access.

In other embodiments, any of the idea(s) above may be used for the resource selection that follows the initial sensing (instead of, or in addition to, the initial sensing).

In other embodiments, any of the idea(s) above may be used for the resource selection without use of initial sensing.

In other embodiments, any of the idea(s) above may be used to by-pass a potential sensing, for example by allocating the probability of "1" to some resources.

UE Provides Information to Other UE(s)

In another embodiment, a transmitting UE that had a previously successful transmission, reception, or communication may send to other UEs (in a unicast, groupcast, or broadcast), the identification of the channels (time and/or frequency) where the initial transmission was successful for the transmitting UE. The other UEs may interpret this information as a resource reserved by the transmitting UE and would refrain from using the reserved resource for the initial access. For example, this information may be provided as part of the "First Stage SCI" described above. As another example, this information may be provided as a Sidelink UE-to-UE communication or message.

Using Zone Information for the Initial Sensing

In another embodiment, the UE may use the geographical location or the Zone information for the initial sensing related with the initial access. This information may define a set of time and/or frequencies to be used for the resources for the initial sensing. Using this information may help to avoid a situation in which two nearby UEs attempt to use similar resources.

Any of the above options may be configured by RRC signaling, or pre-configured in the UE.

Resources that LED to Successful Packet Data Convergence Protocol (PDCP) Reception For the example of 5G NR, successful PDCP reception may rely on successful reception as defined in 3GPP TS 38.323, the NR PDCP Protocol. For the transmitter UE, a successful reception may include successful delivery of a PDCP SDU that may be confirmed by a received PDCP Status Report. For the receiver UE, a successful reception may include sending a PDCP Status Report that reports a successful delivery (i.e., reception by the transmitter UE) of a PDCP SDU.

It is noted that the Status Report may rely on the existing Status Report from 3GPP TS 38.323 which uses a PDCP Control PDU that conveys a PDCP Status Report. Any of the existing fields inside the PDCP Status Report may be used to further discriminate the condition (i.e., the condition would not be only that a PDU is received). The condition may be more selective. In the example of relying on the D/C (Data/Control) field, it may be indicated that a Data PDU was received versus a Control PDU. For example, the D/C field may indicate the Control PDU with a '0' in the D/C field or indicate the Data PDU with a '1' in the D/C field. Other fields in the Status Report may also be used. For example, the bitmap field that indicates which SDUs are missing and which SDUs are correctly received in the receiving PDCP entity may be used.

In other embodiments, a successful reception may be determined if at least one PDCP SDU is correctly received, if at least one PDCP SDU is correctly received while no PDCP SDU is missing, or if the number of PDCP SDU(s) correctly received is higher than the number of PDCP SDU(s) missing. Comparing the number of correctly received PDCP SDUs and the number of missing PDCP SDUs may be performed by a ratio or provided to the UE by configuration, for example, by RRC configuration or pre-configuration. In other embodiments, a successful reception may be determined if the number of PDCP SDUs correctly received is equal to or above a threshold and/or the number of PDCP SDUs missing is equal to or below a threshold. Those thresholds may be defined in, for example, 3GPP TS 38.323; configured in the UE by higher layers, for example, RRC; or pre-configured in the UE. Any combination of the conditions described above to determine a successful reception is possible.

In another embodiment, the Status Report in subclause 6.2.3.1 from 3GPP TS 38.323 may be re-used, with a new field added. For example, determining the condition may be on the transmitter of the Status Report rather than on the receiver of the Status Report. As an example, a new field such as 'Reception f Success' may be defined.

TABLE 1

| New Table: Reception success field | |
|---|---|
| Bit | Description |
| 0 | Reception not successful |
| 1 | Reception successful |

A specific sending of a PDCP Status Report may be triggered in addition to the currently existing triggers for sending a PDCP Status Report in 3GPP TS 38.323 (PDCP entity re-establishment, PDCP data recovery, uplink data switching, or PDCP entity reconfiguration requested by upper layers). This additional trigger may be, for example, that a first PDCP PDU and/or SDU is correctly received or that a number of PDCP PDUs and/or SDUs are correctly received. More generally, the condition for triggering the sending the Status Report may re-use any of the embodiments or conditions described above. It is noted that if both a specific new trigger for sending the PDCP Status Report is used and new fields are defined in the Status Report, it is possible that the conditions for those two are different in one embodiment. In another embodiment, it is possible that those conditions are the same (i.e., the conditions for triggering sending the PDCP Status Report may mirror the information that some of the fields provide).

For the transmitter, the successful delivery of a PDCP Data PDU is confirmed by one of the associated Acknowledged Mode (AM) RLC entities.

Resources that LED to Successful Radio Link Control (RLC) Reception

A successful RLC reception may include successful reception of one or more RLC SDUs (Service Data Units), one or more RLC SDU segments, and/or one or more RLC PDUs (Protocol Data Units). For example, for the receiver UE, the successful RLC reception may include sending a positive acknowledgment for an RLC SDU, an RLC SDU segment, and/or an RLC PDU. This may rely on sending a Status PDU (Status reporting) carrying this information. For the transmitter UE, the successful RLC reception may include receiving a positive acknowledgment from a peer RLC entity for an RLC SDU, an RLC SDU segment, and/or an RLC PDU. This may rely on receiving a Status PDU carrying this information. In some embodiments, more than one positive acknowledgment may be considered and may include, for example, a predetermined number of positive acknowledgments or a predetermined number of positive acknowledgements within a predetermined time period.

In another embodiment, a successful reception may be inferred by the absence of an RLC reception failure. For the receiver UE, this may include the absence of a determination of a negative acknowledgement or the absence of sending a negative acknowledgement for an RLC PDU, an RLC SDU, and/or an RLC SDU segment. This may also include the absence of sending a Status PDU carrying a negative acknowledgement. For the transmitter UE, a successful reception may be inferred based on the absence of receiving a negative acknowledgement from the peer RLC entity. This may include the absence of a Status PDU carrying a negative acknowledgement. In some embodiments, the determination of the absence of an RLC reception failure may be performed within a predetermined time period and/or may rely on a threshold value. For example, the threshold value may be less than a predetermined number of negative acknowledgment determinations and/or receptions. As another example, a successful reception may be based on a threshold value that is less than a predetermined number of negative acknowledgment determinations and/or receptions within the predetermined time period.

In other embodiments, the condition for a successful reception may be inferred by the absence of detecting a reception failure of a PDU (for example, of an Acknowledged Mode Data (AMD) PDU) and/or an SDU. In other embodiments, more than zero detection failures may be considered. For example, a successful reception may be determined if less than a predetermined number of reception failures are detected. Determination of detecting reception failure(s) may be performed within a predetermined time period.

In another embodiment, detecting a successful reception may include that no RLC SDU segment and/or no RLC PDU is detected as lost at lower layers. In another embodiment, detecting a successful reception may include that less than a predetermined number of RLC SDU segment(s) and/or RLC PDU(s) are detected as lost at lower layers. Any of those determination(s) may be performed with a predetermined time period.

In another embodiment, "success" may be determined as successful delivery of a PDU (or upper layer PDU) or a successful delivery of a number of PDUs (or upper layer PDUs). Any of those determination(s) may be performed with a predetermined time period.

In another embodiment, "success" may be determined as the absence of an RLC PDU, an RLC data PDU, or an RLC SDU detected as lost by the receiving side or as less than a predetermined number of RLC data PDU(s), RLC PDU(s), and/or RLC SDU(s) detected as lost by the receiving side. The determination of RLC data PDU(s), RLC PDU(s), and/or RLC SDU(s) detected as lost may be performed within a predetermined time period.

For any of the above, an RLC entity may poll its peer AM RLC entity to trigger Status reporting at the peer RLC entity.

For any of the above, the RLC format Status PDU as defined in 3GPP TS 38.322 (the NR RLC Protocol) subclause 6.2.2.5 may be re-used or a new RLC format may be defined for the receiver RLC entity to inform the transmitter RLC entity of any of the above. One or more of the parameter(s) defined under the Status PDU may be re-used for the above or new parameters may be introduced for the above. Those parameters may be, for example (as currently defined in the Status PDU), the Acknowledgement Sequence Number ACK_SN field (the Sequence Number of the next not received RLC SDU which is not reported as missing in the Status PDU), the Data/Control (D/C) field, a Control PDU Type CPT, the Negative Acknowledgement Sequence Number NACK_SN (the Sequence Number of the RLC SDU or RLC SDU segment that has been detected as lost at the receiving side), the Extension bit 1 E1, the Extension bit E2, the Extension bit E3, the Reserved field R, the SOstart field (the position of the first byte of the portion of the RLC SDU in bytes within the original RLC SDU), the SOend field (the position of the last byte of the portion of the RLC SDU in bytes within the original RLC SDU), and/or the NACK range field (the number of consecutively lost RLC SDUs starting from and including NACK_SN).

In another embodiment, "success" may be determined upon notification of a transmission opportunity by a lower layer or upon notification of at least a predetermined number of transmission opportunities by a lower layer. This may be determined within a predetermined time period.

In another embodiment, "success" may be determined as no error corrected through Automatic Repeat request (ARQ), less than a predetermined number of errors corrected, or less than a predetermined number of errors corrected within a predetermined time period.

In another embodiment, "success" may be determined as no protocol error detected, less than a predetermined number of protocol errors detected, or less than a predetermined number of protocol errors detected within a time period.

In another embodiment, "success" may be determined as no duplicate detected, less than a predetermined number of duplicates detected, or less than a predetermined number of duplicates detected within a time period. Packet duplication of a PDU is defined for the example of NR and RLC in 3GPP TS 38.322.

In any of the above, the predetermined number and/or the predetermined time period may be defined in the standards (e.g., 3GPP TS 38.322 Radio Link Control) or may be configured or pre-configured in the UE. For example, the predetermined number and/or predetermined time period may be configured (communicated) to the UE by the network (e.g., by the gNB via RRC signaling), by another UE via the PC5 interface, or pre-configured in the UE.

Resources that LED to Successful Medium Access Control (MAC) Reception

In some embodiments, resources that led to a successful MAC reception may include resource(s) in terms of time and/or frequency that led to a successful HARQ ACK (positive acknowledgement) for a MAC PDU, a MAC sub-PDU, and/or a MAC SDU. Instead of one successful HARQ ACK, a predetermined number of ACKs may be used. This may be determined within a predetermined time period.

In another embodiment, "success" may be determined as no error corrected through Automatic Repeat request (ARQ) or less than a predetermined number of errors corrected through ARQ. This may be determined within a predetermined time period.

In another embodiment, "success" may be determined as if data for a Transport Block (TB) was successfully decoded, as if data for a predetermined number of TB(s) was successfully decoded, or as if data for at least a predetermined number of TB(s) was successfully decoded. This may be determined within a predetermined time period.

In another embodiment, "success" may be determined if a decoded MAC PDU was delivered to upper layers and/or to the RLC disassembly and demultiplexing entity. The determination may be based on a predetermined number of MAC PDU(s). The determination may apply within a predetermined time period.

In another embodiment, "success" may be determined if the physical layer is instructed by RLC to generate acknowledgement(s) of the data in a TB or a predetermined number of TBs. The determination may apply within a predetermined time period.

In another embodiment, "success" may be determined if the MAC entity does not receive a retransmission for a TB or other resource, if the MAC entity receives less than a predetermined number of retransmission(s) for a TB or other resource, or if the MAC entity does not receive a retransmission for a predetermined number of TBs or other resource. The determination may apply within a predetermined time period. Symmetrically, for the sending entity, "success" may be determined based on the absence of retransmission (rather than the absence of reception of retransmission).

In another embodiment, "success" may be determined if the Random Access Procedure was successfully completed or if less than a predetermined number of Random Access Procedure(s) are successfully completed. The determination may apply within a predetermined time period.

In another embodiment, "success" may be determined if no LBT failure indication is received at the MAC layer from lower layer(s), if less than a predetermined number of LBT failure indication(s) are received from lower layer(s), if no consistent LBT failure is determined (or triggered) at the MAC layer, or if less than a predetermined number of consistent LBT failure(s) are determined (or triggered) at the MAC layer. Other embodiments include not triggering a scheduling request for an LBT failure MAC Control Element (CE), not generating an LBT failure MAC CE, and/or not receiving an LBT failure MAC CE (or, possibly, less than a predetermined number of them or any of them). The condition(s) used for the determination(s) in any of those embodiments may apply within a predetermined time period. Instead of, or in addition to, the foregoing, the Protocol Data Unit (PDU) LBT failure MAC CE, defined in subclause 6.1.3.30 in 3GPP TS 38.321 (the NR MAC Protocol) may be used, including any of its already existing field(s) (C0 to C24), or relying on new fields. In another embodiment, a new PDU format may be defined for this information.

In another embodiment, "success" may be determined if there is a MAC transmission opportunity, if there are a predetermined number of MAC transmission opportunities, or if there are more than a predetermined number of MAC transmission opportunities. The determination may apply within a predetermined time period.

In another embodiment, "success" may be determined if there is no transmission resource selection or reselection triggered, if there are a predetermined number of transmission resource selections or reselections triggered, or if there are less than a predetermined number of transmission resource selections or reselections triggered. The determination may apply within a predetermined time period.

In another embodiment, "success" may be determined if no beam failure is detected or if less than a predetermined number of beam failure(s) are detected. The determination may apply within a predetermined time period. Beam failure detection may involve counting beam failure instance indications from the lower layers to the MAC entity (for example, as defined in 3GPP TS 38.321).

In another embodiment, "success" may be determined in case of a successful contention resolution or in case of more than a predetermined number of successful contention resolution(s). The determination may apply within a predetermined time period.

Other conditions for determination of "success" may include:

Instructing the physical layer to generate a positive acknowledgement of the data, possibly in a specific TB and/or other resource.

Instructing the physical layer to generate a positive acknowledgement corresponding to a transmission on one or more specific channel(s), e.g., PUCCH (Physical Uplink Control CHannel).

An acknowledgement corresponding to the transmission on any channel (for example, PSSCH) is obtained from the physical layer.

An acknowledgement (positive acknowledgement) to a corresponding Sidelink HARQ entity is received and/or sent (e.g., for a Sidelink process).

A HARQ buffer (e.g., of an associated Sidelink process) is flushed or not flushed.

A positive acknowledgement for a transmission of a MAC PDU was sent and/or received.

Other conditions for determination of "success" may be inferred by the absence of one or more of the following:

Instructing the physical layer to generate a negative acknowledgement of the data, possibly in a specific TB and/or other resource.

Instructing the physical layer to generate a negative acknowledgement corresponding to a transmission on one or more specific channel(s), e.g., PUCCH.

A Radio Link failure, for example a HARQ-based Sidelink Radio Link failure, is detected. In some embodiments, this may be based on a number of consecutive DTX (discontinuous transmissions) on PSFCH (Physical Sidelink Feedback CHannel) reception occasions for a PC5-RRC connection, or may apply for each PSFCH reception occasion associated to the PSSCH transmission, as described in the 3GPP TS 38.321.

A negative acknowledgement to a corresponding Sidelink HARQ entity is received and/or sent (e.g., for a Sidelink process).

A HARQ buffer (e.g., of an associated Sidelink process) is flushed or not flushed.

A negative acknowledgement for a transmission of a MAC PDU was sent and/or received, possibly if a negative-only acknowledgement was enabled in the SCI or if a positive-negative acknowledgement was enabled.

A number of HARQ retransmissions has been reached, possibly selected by the MAC entity.

Resources that LED to Successful IP Packet Reception

For successful IP packet reception, the transmitter UE may send a predetermined field, keyword, or parameter value to the receiver (possibly in a message, new or already existing). The receiver may reply to the transmitter UE with another predetermined field (which may be the same field). A timer may be used at the application side and an absence of a reply within a predetermined time period may be determined as a failure (i.e., the absence of success).

Resources that LED to Successful Physical Layer Connection and/or Reception

Conditions for determining a "success" may include one or more of:

The physical layer is instructed by the MAC layer to generate a positive acknowledgement of data, possibly for a specific resource, for example a TB.

The Physical Random Access procedure is successful/completed.

A HARQ-Ack is determined (ACK value) or reported at the physical layer, for example, a Sidelink HARQ-Ack.

Conditions for determining a "success" may be inferred by the absence of one or more of:

The physical layer is instructed by the MAC layer to generate a negative acknowledgement of data (for example, a Sidelink HARQ-Nack), possibly for a specific resource, for example a TB.

Resources that LED to Successful PC5-RRC (Radio Resource Control) Connection and/or Reception Conditions for determining a "success" may include one or more of:

An RRC Connection establishment for Sidelink is successful, for example an RRCSetup message is received or sent.

An RRCReconfigurationCompleteSidelink message is received or sent.

Conditions for determining a "success" may be inferred by the absence of one or more of:

An RRC Connection establishment for Sidelink is unsuccessful, for example an RRCReject is received or sent.

A Sidelink Radio Link Failure (RLF) is detected.

An indication is received from the sidelink RLC entity that the maximum number of retransmissions has been reached, e.g., for a specific destination.

An indication is received from the MAC entity that the maximum number of consecutive HARQ DTXs has been reached, e.g., for a specific destination.

The Timer T400 (started upon transmission of RRCReconfigurationSidelink, stopped upon reception of RRCReconfigurationFailureSidelink/RRCReconfigurationCompleteSidelink) expires, e.g., for a specific destination.

RRC indicates the release of the PC5-RRC connection to the upper layers for a specific destination (i.e., PC5 is unavailable).

An RRCReconfigurationFailureSidelink message is received or sent.

For the example of NR, this may rely on the Radio Resource Control (RRC) NR protocol.

In any of the scheme(s) of this disclosure, a determination may be based on more than one instance of one specific condition (and/or with more than one instance of another condition). The logical functions "or," "exclusive or," or "and" may be used. The determination may apply within a predetermined time period. For example, an "erasing timer" may be used. In another (possibly complementary) embodiment, the determination may rely on consecutive conditions. The scheme(s) described in this disclosure may be controlled by a timer and/or by a disabling procedure, after which the scheme is deactivated (i.e., reverting to the legacy process of random sensing and/or not using information on success) after a specific period of time, and/or after that the access/communication was unsuccessful (e.g., more than a specific number of times or more than a specific number of times within a predetermined time period).

The suggested scheme(s) above may be used specifically by UEs in close vicinity and/or travelling at equivalent speed or near-equivalent speeds. Another possible embodiment is that any embodiment in this disclosure applies only to UEs in close vicinity, and/or travelling at equivalent speed or near-equivalent speeds, and/or travelling in the same direction.

In another embodiment, any embodiment described in this disclosure may apply conditionally to the UE being in a Sidelink co-existence setting.

Although the examples provided in this disclosure relate to 3GPP NR (New Radio), the embodiments in this disclosure are not limited to this Radio Access Technology (RAT) and may apply to other RAT(s), for example LTE/E-UTRA and/or 6G. Although the examples provided in this disclosure relate to 3GPP Sidelink, the embodiments in this disclosure are not limited to 3GPP and may apply to other systems, for example (but not limited to), Digital Enhanced Cordless Telecommunications/Digital European Cordless Telecommunications (DECT), IEEE 802.11 (for example, Wi-Fi), and other wireless communication technologies and protocols.

User Equipment (UE)

Figure 2:
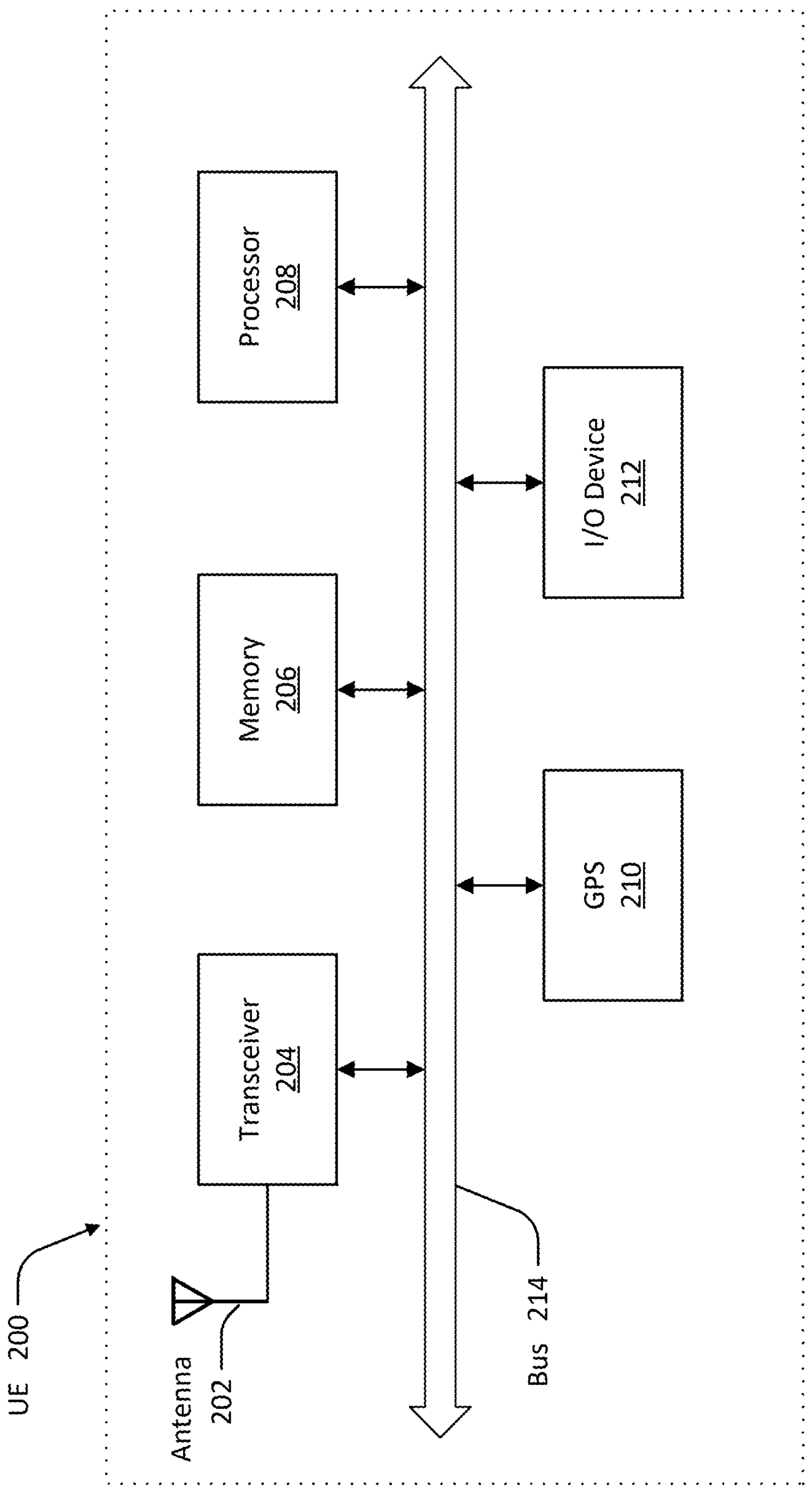
FIG. 2 is a block diagram of a UE, consistent with some embodiments of the present disclosure.

FIG. 2 is a block diagram of a UE 200, consistent with some embodiments of the present disclosure. The UE 200 may be mounted in a moving vehicle, in a fixed position (e.g., as a roadside unit (RSU)), or may be carried by a person. The UE 200 may take any form, including but not limited to, a vehicle, a component mounted in a vehicle, an RSU, a laptop computer, a wireless terminal including a mobile phone, a wireless handheld device, a wireless personal device, or any other form. Referring to FIG. 2, the UE 200 may include an antenna 202 that may be used for transmission and/or reception of electromagnetic signals to/from a base station or other UEs. The antenna 202 may include one or more antenna elements and may enable different input-output antenna configurations, for example, multiple input multiple output (MIMO) configuration, multiple input single output (MISO) configuration, and single input multiple output (SIMO) configuration. In some embodiments, the antenna 202 may include multiple (e.g., tens or hundreds) antenna elements and may enable multi-antenna functions such as beamforming. In some embodiments, the antenna 202 is a single antenna.

The UE 200 may include a transceiver 204 that is coupled to the antenna 202. The transceiver 204 may be a wireless transceiver at the UE 200 and may communicate bi-directionally with a base station or other UEs. For example, the transceiver 204 may receive wireless signals from a base station via downlink and transmit wireless signals to the base station via uplink communication. The transceiver 204 may also receive wireless signals from and transmit wireless signals to another UE or roadside unit (RSU) via sidelink communication. The transceiver 204 may include a modem to modulate the packets and provide the modulated packets to the antenna 202 for transmission, and to demodulate packets received from the antenna 202.

The UE 200 may include a memory 206. The memory 206 may be any type of computer-readable storage medium including volatile or non-volatile memory devices, or a combination thereof. The computer-readable storage medium includes, but is not limited to, non-transitory computer storage media. A non-transitory storage medium may be accessed by a general purpose or special purpose computer. Examples of non-transitory storage medium include, but are not limited to, a portable computer diskette, a hard disk, random access memory (RAM), read-only memory (ROM), an erasable programmable read-only memory (EPROM), electrically erasable programmable ROM (EEPROM), a digital versatile disk (DVD), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable medium.

The memory 206 may store information related to identities of the UE 200 and the signals and/or data received by the antenna 202. The memory 206 may also store post-processing signals and/or data. The memory 206 may also store computer-readable program instructions, mathematical models, and algorithms that are used in signal processing in transceiver 204 and computations in a processor 208. The memory 206 may further store computer-readable program instructions for execution by the processor 208 to operate UE 200 to perform various functions described elsewhere in this disclosure. In some examples, the memory 206 may include a basic input/output system (BIOS) which may control basic hardware or software operation such as the interaction with peripheral components or devices.

The computer-readable program instructions of the present disclosure may be assembler instructions, instruction-set-architecture (ISA) instructions, machine instructions, machine-dependent instructions, microcode, firmware instructions, state-setting data, or source code or object code written in any combination of one or more programming languages, including an object-oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The UE 200 may include the processor 208 that may include a hardware device with processing capabilities. The processor 208 may include at least one of a general-purpose processor, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or other programmable logic device. Examples of the general-purpose processor include, but are not limited to, a microprocessor, any conventional processor, a controller, a microcontroller, or a state machine. In some embodiments, the processor 208 may be implemented using a combination of devices (e.g., a combination of a DSP and a microprocessor, multiple microprocessors, one or more microprocessors in conjunction with a DSP core, or any other such configuration). The processor 208 may receive downlink signals or sidelink signals from the transceiver 204 and further process the signals. The processor 208 may also receive data packets from the transceiver 204 and further process the packets. In some embodiments, the processor 208 may be configured to operate a memory using a memory controller. In some embodiments, the memory controller may be integrated into the processor 208. The processor 208 may be configured to execute computer-readable instructions stored in a memory (e.g., the memory 206) to cause the UE 200 to perform various functions.

The UE 200 may include a global positioning system (GPS) 210. The GPS 210 may be used for enabling location-based services or other services based on a geographical position of the UE 200 and/or for synchronization among UEs. The GPS 210 may receive global navigation satellite systems (GNSS) signals from a single satellite or a plurality of satellite signals via the antenna 202 and provide a geographical position of the UE 200 (e.g., coordinates of the UE 200).

The UE 200 may include an input/output (I/O) device 212 that may be used to communicate a result of signal processing and computation to a user or another device. The I/O device 212 may include a user interface including a display and an input device to transmit a user command to the processor 208. The display may be configured to display a status of signal reception at the UE 200, the data stored at the memory 206, a status of signal processing, and a result of computation, etc. The display may include, but is not limited to, a cathode ray tube (CRT), a liquid crystal display (LCD), a light-emitting diode (LED), a gas plasma display, a touch screen, or other image projection devices for displaying information to a user. The input device may be any type of computer hardware equipment used to receive data and control signals from a user. The input device may include, but is not limited to, a keyboard, a mouse, a scanner, a digital camera, a joystick, a trackball, cursor direction keys, a touchscreen monitor, or audio/video commanders, etc.

The UE 200 may further include a machine interface 214, such as an electrical bus that connects the transceiver 204, the memory 206, the processor 208, the GPS 210, and the I/O device 212.

In some embodiments, the UE 200 may be configured to or programmed for sidelink communications. The processor 208 may be configured to execute the instructions stored in the memory 206 to perform a method for selecting a sidelink radio resource by the UE 200, such as the method 100 described in connection with FIG. 1.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include," or "contain" may be used interchangeably and have the same meaning and are to be construed as inclusive and open-ending. The terms "comprise", "include," or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance, or an example." By reading this disclosure, including the description of the embodiments and the drawings, it will be appreciated by a person of ordinary skill in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

The flowchart and block diagram in the figures illustrate examples of the architecture, functionality, and operation of possible implementations of systems, methods, and devices according to various embodiments. It should be noted that, in some alternative implementations, the functions noted in blocks may occur out of the order noted in the figures. For example, two blocks shown in succession may, in fact, be executed substantially concurrently, or the blocks may sometimes be executed in the reverse order, depending upon the functionality involved. Likewise, additional steps may be included in such methods, and certain steps may be omitted or combined, in methods consistent with various embodiments.

It is understood that the described embodiments are not mutually exclusive, and elements, components, materials, or steps described in connection with one example embodiment may be combined with, or eliminated from, other embodiments in suitable ways to accomplish desired design objectives.

Reference herein to "some embodiments" or "some exemplary embodiments" means that a particular feature, structure, or characteristic described in connection with the embodiment can be included in at least one embodiment. The appearance of the phrases "one embodiment," "some embodiments," or "another embodiment" in various places in the present disclosure do not all necessarily refer to the same embodiment, nor are separate or alternative embodiments necessarily mutually exclusive of other embodiments.

Additionally, the articles "a" and "an" as used in the present disclosure and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

Although the elements in the following method claims, if any, are recited in a particular sequence, unless the claim recitations otherwise imply a particular sequence for implementing some or all of those elements, those elements are not necessarily intended to be limited to being implemented in that particular sequence.

It is appreciated that certain features of the present disclosure, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

It will be further understood that various modifications, alternatives and variations in the details, materials, and arrangements of the parts which have been described and illustrated to explain the nature of described embodiments may be made by those skilled in the art without departing from the scope of this disclosure. Accordingly, the following claims embrace all such alternatives, modifications, and variations that fall within the terms of the claims.

Clause 1. A method for selecting a sidelink radio resource by a user equipment (UE), comprising:

transmitting on a selected radio resource from the UE to one or more receivers;

determining whether the UE successfully transmits on the selected radio resource;

based on a determination that the UE successfully transmits on the selected radio resource, identifying the selected radio resource as a preferred radio resource; and on a next transmission opportunity by the UE, prioritizing transmission on the preferred radio resource.

Clause 2. The method of Clause 1, further comprising:

selecting a radio resource from a resource pool as the selected radio resource.

Clause 3. The method of Clause 2, wherein the resource pool is provided to the UE by configuration or pre-configuration.

Clause 4. The method of Clause 1, wherein determining whether the UE successfully transmits on the selected radio resource includes determining whether the selected radio resource is available after a sensing on one or more radio resources.

Clause 5. The method of Clause 1, wherein determining whether the UE successfully transmits on the selected radio resource includes determining absence of a collision on the selected radio resource during transmission.

Clause 6. The method of Clause 5, wherein the absence of a collision is determined based on no collision being detected within a predetermined time period after the transmission.

Clause 7. The method of Clause 1, wherein determining whether the UE successfully transmits on the selected radio resource is determined based on a reply being received from the one or more receivers within a predetermined time period after the transmission.

Clause 8. The method of Clause 1, wherein determining whether the UE successfully transmits on the selected radio resource includes determining that there was a previous successful reception by the one or more receivers from the UE on the selected radio resource.

Clause 9. The method of Clause 1, wherein determining whether the UE successfully transmits on the selected radio resource includes determining that a hybrid automatic repeat request acknowledgement is received for the transmission.

Clause 10. The method of Clause 1, wherein determining whether the UE successfully transmits on the selected radio resource includes determining that a hybrid automatic repeat request negative acknowledgement is not received for the transmission within a predetermined time period.

Clause 11. The method of Clause 1, wherein determining whether the UE successfully transmits on the selected radio resource includes determining that the transmission led to a successful radio link control reception.

Clause 12. The method of Clause 1, wherein determining whether the UE successfully transmits on the selected radio resource includes determining that the transmission led to a successful radio link control service data unit reception.

Clause 13. The method of Clause 1, wherein determining whether the UE successfully transmits on the selected radio resource includes determining that the transmission led to a successful radio link control service data unit segment reception.

Clause 14. The method of Clause 1, wherein determining whether the UE successfully transmits on the selected radio resource includes determining that the transmission led to a successful radio link control protocol data unit reception.

Clause 15. The method of Clause 1, wherein determining whether the UE successfully transmits on the selected radio resource includes determining that the transmission led to a successful medium access control reception.

Clause 16. The method of Clause 1, wherein determining whether the UE successfully transmits on the selected radio resource includes determining that the transmission led to a predetermined number of hybrid automatic repeat request acknowledgements.

Clause 17. The method of Clause 1, wherein determining whether the UE successfully transmits on the selected radio resource includes determining that the transmission led to a predetermined number of hybrid automatic repeat request acknowledgements within a predetermined time period.

Clause 18. The method of Clause 1, wherein determining whether the UE successfully transmits on the selected radio resource includes determining that the transmission led to a successful Internet Protocol packet reception.

Clause 19. The method of Clause 1, wherein determining whether the UE successfully transmits on the selected radio resource includes determining that the transmission led to a successful physical layer connection.

Clause 20. The method of Clause 1, wherein determining whether the UE successfully transmits on the selected radio resource includes determining that the transmission led to a successful physical layer reception.

Clause 21. The method of Clause 20, wherein the successful physical layer reception is on a physical uplink control channel.

Clause 22. The method of Clause 20, wherein the successful physical layer reception is on a physical sidelink shared channel.

Clause 23. The method of Clause 1, wherein determining whether the UE successfully transmits is based on using random resource selection.

Clause 24. The method of Clause 23, wherein the preferred radio resource has a higher probability than one or more other radio resources.

Clause 25. The method of Clause 1, wherein identifying the selected radio resource as a preferred radio resource comprises:

identifying the selected radio resource as the preferred radio resource after a predetermined number of successful transmissions using the selected radio resource.

Clause 26. The method of Clause 1, wherein identifying the selected radio resource as a preferred radio resource comprises:

identifying the selected radio resource as the preferred radio resource after a predetermined number of successful transmissions using the selected radio resource within a predetermined time period.

Clause 27. The method of Clause 1, further comprising:

selecting the preferred radio resource based on sensing on one or more radio resources; and transmitting on the preferred radio resource.

Clause 28. The method of Clause 1, further comprising:

storing an identifier of the preferred radio resource in a memory of the UE.

Clause 29. A user equipment (UE) for selecting a sidelink radio resource by the UE, the UE comprising:

a memory configured to store instructions; and a processor configured to execute the instructions stored in the memory to:

transmit on a selected radio resource from the UE to one or more receivers;

determine whether the UE successfully transmits on the selected radio resource;

based on a determination that the UE successfully transmits on the selected radio resource, identify the selected radio resource as a preferred radio resource; and on a next transmission opportunity by the UE, prioritize transmission on the preferred radio resource.

Clause 30. The UE of Clause 29, wherein the processor is further configured to: select a radio resource from a resource pool as the selected radio resource.

Clause 31. The UE of Clause 30, wherein the resource pool is provided to the UE by configuration or pre-configuration.

Clause 32. The UE of Clause 29, wherein the processor is further configured to determine whether the UE successfully transmits on the selected radio resource by determining whether the selected radio resource is available after a sensing on one or more radio resources.

Clause 33. The UE of Clause 29, wherein the processor is further configured to determine whether the UE successfully transmits on the selected radio resource by determining absence of a collision on the selected radio resource during transmission.

Clause 34. The UE of Clause 33, wherein the absence of a collision is determined based on no collision being detected within a predetermined time period after the transmission.

Clause 35. The UE of Clause 29, wherein the processor is further configured to determine whether the UE successfully transmits on the selected radio resource based on a reply being received from the one or more receivers within a predetermined time period after the transmission.

Clause 36. The UE of Clause 29, wherein the processor is further configured to determine whether the UE successfully transmits on the selected radio resource by determining that there was a previous successful reception by the one or more receivers from the UE on the selected radio resource.

Clause 37. The UE of Clause 29, wherein the processor is further configured to determine whether the UE successfully transmits on the selected radio resource by determining that a hybrid automatic repeat request acknowledgement is received for the transmission.

Clause 38. The UE of Clause 29, wherein the processor is further configured to determine whether the UE successfully transmits on the selected radio resource by determining that a hybrid automatic repeat request negative acknowledgement is not received for the transmission within a predetermined time period.

Clause 39. The UE of Clause 29, wherein the processor is further configured to determine whether the UE successfully transmits on the selected radio resource by determining that the transmission led to a successful radio link control reception.

Clause 40. The UE of Clause 29, wherein the processor is further configured to determine whether the UE successfully transmits on the selected radio resource by determining that the transmission led to a successful radio link control service data unit reception.

Clause 41. The UE of Clause 29, wherein the processor is further configured to determine whether the UE successfully transmits on the selected radio resource by determining that the transmission led to a successful radio link control service data unit segment reception.

Clause 42. The UE of Clause 29, wherein the processor is further configured to determine whether the UE successfully transmits on the selected radio resource by determining that the transmission led to a successful radio link control protocol data unit reception.

Clause 43. The UE of Clause 29, wherein the processor is further configured to determine whether the UE successfully transmits on the selected radio resource by determining that the transmission led to a successful medium access control reception.

Clause 44. The UE of Clause 29, wherein the processor is further configured to determine whether the UE successfully transmits on the selected radio resource by determining that the transmission led to a predetermined number of hybrid automatic repeat request acknowledgements.

Clause 45. The UE of Clause 29, wherein the processor is further configured to determine whether the UE successfully transmits on the selected radio resource by determining that the transmission led to a predetermined number of hybrid automatic repeat request acknowledgements within a predetermined time period.

Clause 46. The UE of Clause 29, wherein the processor is further configured to determine whether the UE successfully transmits on the selected radio resource by determining that the transmission led to a successful Internet Protocol packet reception.

Clause 47. The UE of Clause 29, wherein the processor is further configured to determine whether the UE successfully transmits on the selected radio resource by determining that the transmission led to a successful physical layer connection.

Clause 48. The UE of Clause 29, wherein the processor is further configured to determine whether the UE successfully transmits on the selected radio resource by determining that the transmission led to a successful physical layer reception.

Clause 49. The UE of Clause 48, wherein the successful physical layer reception is on a physical uplink control channel.

Clause 50. The UE of Clause 48, wherein the successful physical layer reception is on a physical sidelink shared channel.

Clause 51. The UE of Clause 29, wherein the processor is further configured to determine whether the UE successfully transmits based on using random resource selection.

Clause 52. The UE of Clause 51, wherein the preferred radio resource has a higher probability than one or more other radio resources.

Clause 53. The UE of Clause 29, wherein the processor is further configured to identify the selected radio resource as the preferred radio resource after a predetermined number of successful transmissions using the selected radio resource.

Clause 54. The UE of Clause 29, wherein the processor is further configured to identify the selected radio resource as the preferred radio resource after a predetermined number of successful transmissions using the selected radio resource within a predetermined time period.

Clause 55. The UE of Clause 29, wherein the processor is further configured to: select the preferred radio resource based on sensing on one or more radio resources; and transmit on the preferred radio resource.

Clause 56. The UE of Clause 29, wherein the processor is further configured to: store an identifier of the preferred radio resource in the memory.

Clause 57. A non-transitory computer-readable medium storing instructions that are executable by one or more processors of a user equipment (UE) in a communication network to perform a method, the method comprising:

transmitting on a selected radio resource from the UE to one or more receivers;

determining whether the UE successfully transmits on the selected radio resource;

based on a determination that the UE successfully transmits on the selected radio resource, identifying the selected radio resource as a preferred radio resource; and on a next transmission opportunity by the UE, prioritizing transmission on the preferred radio resource.

The invention claimed is:

1. A method for sidelink transmission based on sensing a channel by a user equipment (UE), comprising:

performing, by the UE, sensing of the channel;

performing, by the UE, based on a result of the sensing, a first sidelink transmission on a radio resource in the channel to one or more receivers;

receiving, by the UE, one or more replies each of which indicates hybrid automatic repeat request acknowledgement (HARQ-ACK) or hybrid automatic repeat request negative acknowledgement (HARQ-NACK) for the first sidelink transmission;

determining, by the UE, based on the one or more replies, whether the HARQ-NACK is received for the first sidelink transmission; and prioritizing, by the UE, a second sidelink transmission on the radio resource in the channel on a next transmission opportunity for earlier transmission responsive to determining that the HARQ-NACK is not received for the first sidelink transmission, relative to a case where the HARQ-NACK is received for the first sidelink transmission, wherein prioritizing the second sidelink transmission on the radio resource in the channel on a next transmission opportunity for earlier transmission comprises shortening a time length of the sensing relative to the case where the HARQ-NACK is received for the first sidelink transmission.

2. A user equipment (UE), comprising:

one or more transceivers configured to:

perform sensing of a channel;

perform, based on a result of the sensing, a first sidelink transmission on a radio resource in the channel to one or more receivers; and receive one or more replies each of which indicates hybrid automatic repeat request acknowledgement (HARQ-ACK) or hybrid automatic repeat request negative acknowledgement (HARQ-NACK) for the first sidelink transmission; and one or more controllers configured to:

determine, based on the one or more replies, whether the HARQ-NACK is received for the first sidelink transmission; and prioritize a second sidelink transmission on the radio resource in the channel on a next transmission opportunity for earlier transmission responsive to determining that the HARQ-NACK is not received for the first sidelink transmission, relative to a case where the HARQ-NACK is received for the first sidelink transmission, wherein prioritizing the second sidelink transmission on the radio resource in the channel on a next transmission opportunity for earlier transmission comprises shortening a time length of the sensing relative to the case where the HARQ-NACK is received for the first sidelink transmission.

* * * * *